(12) United States Patent
Ichinose et al.

(10) Patent No.: US 8,688,971 B2
(45) Date of Patent: Apr. 1, 2014

(54) REMOTE ACCESS METHOD

(75) Inventors: Susumu Ichinose, Kanagawa (JP);
Kentaro Takaya, Kanagawa (JP);
Kikuji Kato, Kanagawa (JP); Hiroaki Shirouzu, Kanagawa (JP); Shinpei Hayakawa, Kanagawa (JP)

(73) Assignee: NTT IT Corporation, Yokohama (JP)

( * ) Notice: Subject to any disclaimer, the term of this patent is extended or adjusted under 35 U.S.C. 154(b) by 1350 days.

(21) Appl. No.: 12/028,222

(22) Filed: Feb. 8, 2008

(65) Prior Publication Data

US 2010/0031331 A1    Feb. 4, 2010

Related U.S. Application Data

(60) Provisional application No. 60/928,741, filed on May 11, 2007.

(30) Foreign Application Priority Data

Dec. 27, 2007    (JP) ................................ 2007-337195

(51) Int. Cl.
| | | |
|---|---|---|
| H04L 29/06 | (2006.01) | |
| G06F 21/00 | (2013.01) | |
| G06F 15/173 | (2006.01) | |
| G06F 15/16 | (2006.01) | |
| G06F 17/30 | (2006.01) | |

(52) U.S. Cl.
USPC ........... 713/153; 713/150; 713/182; 713/185; 709/217; 709/218; 709/223; 709/225; 709/229; 726/2; 726/5; 726/9

(58) Field of Classification Search
USPC ............ 726/5, 6, 9, 15, 26–28; 713/155, 156, 713/183, 185, 150, 153, 182; 380/277; 709/217, 218, 223–229
See application file for complete search history.

(56) References Cited

U.S. PATENT DOCUMENTS

| | | | |
|---|---|---|---|
| 6,971,005 B1 * | 11/2005 | Henry et al. .................. | 713/155 |
| 7,111,324 B2 * | 9/2006 | Elteto et al. ...................... | 726/9 |
| 7,231,526 B2 * | 6/2007 | Hon et al. ..................... | 713/185 |
| 7,552,467 B2 * | 6/2009 | Lindsay ............................ | 726/5 |
| 7,565,529 B2 * | 7/2009 | Beck et al. .................... | 713/156 |
| 7,574,731 B2 * | 8/2009 | Fascenda .......................... | 726/2 |
| 7,739,726 B2 * | 6/2010 | Iwanski et al. .................... | 726/9 |
| 7,743,409 B2 * | 6/2010 | Gonzalez et al. ................. | 726/9 |
| 7,748,031 B2 * | 6/2010 | Gonzalez et al. ................. | 726/9 |
| 7,917,628 B2 * | 3/2011 | Hesselink et al. ............. | 709/227 |
| 7,934,251 B2 * | 4/2011 | Hesselink et al. .............. | 726/11 |

(Continued)

FOREIGN PATENT DOCUMENTS

| | | | |
|---|---|---|---|
| JP | 2001-273211 A | 10/2001 | |
| JP | 200224182 A | 1/2002 | |
| JP | 2002328846 A | 11/2002 | |
| JP | 2007110590 A | 4/2007 | |

*Primary Examiner* — Tae Kim
(74) *Attorney, Agent, or Firm* — The Webb Law Firm

(57) ABSTRACT

All operations available on an intranet are securely performed from an outside of the intranet without taking out a file on the intranet from the intranet. A file on the intranet is not taken out, but, instead of this, image information on a target computer 1 is transmitted to an operational computer 4 with the http protocol, the https protocol, or the SSL protocol, and keyboard information, pointing information, or the like are transmitted from an operational computer 4 to the target computer 1. Consequently, the target computer 1 is operated.

14 Claims, 5 Drawing Sheets

(56) References Cited

U.S. PATENT DOCUMENTS

| | | | |
|---|---|---|---|
| 8,051,180 B2 * | 11/2011 | Mazzaferri et al. | 709/227 |
| 8,397,287 B2 * | 3/2013 | Mullick et al. | 726/15 |
| 8,566,925 B2 * | 10/2013 | Udupa et al. | 726/21 |
| 2002/0007462 A1 | 1/2002 | Omata | |
| 2002/0114461 A1 | 8/2002 | Shimada et al. | |
| 2002/0159601 A1 * | 10/2002 | Bushmitch et al. | 380/277 |
| 2002/0178361 A1 * | 11/2002 | Genty et al. | 713/175 |
| 2003/0131263 A1 * | 7/2003 | Keane et al. | 713/201 |
| 2005/0114711 A1 * | 5/2005 | Hesselink et al. | 713/201 |
| 2005/0120082 A1 * | 6/2005 | Hesselink et al. | 709/203 |
| 2005/0160290 A1 * | 7/2005 | Moon et al. | 713/201 |
| 2006/0112280 A1 * | 5/2006 | Cohen et al. | 713/186 |
| 2006/0265468 A1 * | 11/2006 | Iwanski et al. | 709/217 |
| 2007/0011724 A1 * | 1/2007 | Gonzalez et al. | 726/4 |
| 2007/0106776 A1 * | 5/2007 | Konno et al. | 709/223 |
| 2007/0107061 A1 * | 5/2007 | Engle et al. | 726/25 |
| 2007/0168747 A1 * | 7/2007 | Konno et al. | 714/38 |
| 2007/0174630 A1 * | 7/2007 | Shannon et al. | 713/183 |
| 2007/0179955 A1 * | 8/2007 | Croft et al. | 707/9 |
| 2007/0180509 A1 * | 8/2007 | Swartz et al. | 726/9 |
| 2007/0192329 A1 * | 8/2007 | Croft et al. | 707/10 |
| 2008/0034419 A1 * | 2/2008 | Mullick et al. | 726/15 |
| 2008/0229402 A1 * | 9/2008 | Smetters et al. | 726/9 |
| 2008/0256617 A1 * | 10/2008 | Cartwell | 726/9 |
| 2008/0263649 A1 * | 10/2008 | Smadja et al. | 726/9 |
| 2008/0295159 A1 * | 11/2008 | Sentinelli | 726/6 |

* cited by examiner

REMOTE ACCESS METHOD

CROSS-REFERENCE TO RELATED APPLICATIONS

This application claims the benefit of the filing date of U.S. Provisional Patent Application No. 60/928,741 filed on May 11, 2007 in U.S.A. Further, this application claims priority under JP Patent Application 2007-337195 filed on Dec. 27, 2007 in Japan. This application claims the benefit of the filing dates of the above-identified applications, which are incorporated herein by reference in its entirety.

BACKGROUND OF THE INVENTION

1. Technical Field

The present invention relates to a remote access method in which an operational computer on an intranet is connected to a target computer on the same or the other intranet via a router and/or a firewall over the Internet to perform a secure operation. Further, the present invention relates to a remote access method in which an invalid user is prevented from logging in to the target computer when the operational computer is connected to the target computer over the network.

2. Related Art

Conventionally, IPsec and SSL-VPN are utilized as a remote access method for a connection via a router and/or a firewall. According to IPsec, an operation is made in a manner in which an intranet is virtually excluded from the intranet. Accordingly, there is an information management problem in which a file on the intranet is taken out of the intranet. On the other hand, in a case of SSL-VPN, it is only Web applications that can be used. Therefore, there is a problem that all applications operable on a target computer on an intranet cannot be utilized from an outside of the intranet (see Patent Document 1).

In addition, as concern about security in business fields grows over a remote access method between computers, a technique of server based computing (SBC) becomes widely utilized, in which an operational computer and a target computer are mutually connected over a network to achieve secure business operations. SBC is characterized in that, generally, a large number of operational computers is connected to a small number of target computers, that a different user authentication information is input from each operational computer to login to a target computer, and that a specific application such as a terminal service on a small number of the target computers is shared among a large number of people.

However, when a target computer connected over a network is remotely accessed from an operational computer, for example, by utilizing IPsec-VPN or SSL-VPN, there is a problem in which it is possible to perform logging in with authentication information on some other user in "spoofing" the user.

[Patent Document 1] JP-A-2001-273211

An object is to securely perform all operations available on an intranet from an outside of the intranet without taking out a file on the intranet from the intranet.

An other object of the present invention is to prevent an invalid user from performing logging in "spoofing" the other user when a target computer is accessed from an operational computer.

SUMMARY OF THE INVENTION

To solve the problem described above, a remote access method of the present invention does not take a file out of an intranet but transmits image information on a target computer to an operational computer with the http, https, or SSL protocol and also transmits keyboard information, pointing information, or the like from the operational computer to the target computer, thereby enabling an operation of the target computer.

The present invention proposes a new remote access technique in which it is possible to securely perform operations available on an intranet from an outside of the intranet without taking out a file on the intranet from the intranet and, further, it is possible to prevent an invalid user from logging in by using authentication information on a valid user. This technique transmits image information on a target computer to an operational computer by using the http, https, or SSL protocol and transmits keyboard information, pointing information, or the like from the operational computer to the target computer. Consequently, an operation of the target computer is made possible without taking out a file out of the intranet. In addition, the both of unique identification information on an external storage medium such as a USB (Universal Serial Bus) key storing a remote access program carried by a user and authentication information on the user are authenticated before an access from an operational computer to a target computer is allowed. Therefore, it is possible to prevent logging in "spoofing" the other user.

To solve the problem described above, in a remote access method according to a first aspect of the present invention, for example, as shown in FIG. 1, a remote access method in which an operational computer 4 on an intranet accesses a target computer 1 on the same or on the other intranet via a relay management server 2 on the Internet, comprises: a step in which each user carries an external storage medium 5 having unique identification information different from each other; a step in which the target computer 1 transmits authentication information on each user to the relay management server 2 to establish a connection; a step in which at least a portion of a program for connecting the operational computer 4 and the relay management server 2 is stored in advance in the external storage medium 5; a step in which the external storage medium 5 having the unique identification information is connected to the operational computer 4; a step in which the operational computer 4 processes the unique identification information to generate special authentication information for the relay management server 2 to perform authentication; a step in which the user inputs authentication information for authentication of the user from the operational computer 4; a step in which the operational computer 4 transmits authentication information and the special authentication information for authentication of the user to the relay management server 2; and a step in which the relay management server 2 permits connection to the operational computer 4 when the both of the authentication information and the special authentication information for authentication of the user are transmitted from the operational computer. Here, the term the "Internet" as herein referred to includes an intranet on which a Web site can be viewed. According to this constitution, authentication is performed with the both of the authentication information and the special authentication information for authenticating a user. Consequently, it is possible to improve security of connection by the remote access method.

Further, in a remote access method according to a second aspect of the present invention in the remote access method according to the first aspect, the target computer 1 uses an http protocol, an https protocol, or an SSL protocol to transmit image information to the operational computer 4 via the relay management server 2, the operational computer 4 uses the http protocol, the https protocol, or the SSL protocol to transmit keyboard information, pointing information, and the like to the target computer 1 via the relay management server 2, the relay management server 2 translates information on the target computer 1 to transfer to the operational computer 4 and translates information on the operational computer 4 to transfer to the target computer 1, a tunneling connection utilizing port 80 is performed by using two sessions or more when the http protocol is used, and a tunneling connection utilizing port 443 is performed by using one session or more when the https protocol or the SSL protocol is used. According to this constitution, a file on the target computer 1 is not taken out of the intranet. Consequently, security can be ensured. In addition, communication between the target computer and the relay management server can be efficiently performed.

Further, in a remote access method according to a third aspect of the present invention in the remote access method according to the first aspect, a portion which cannot be rewritten by a user is provided at least in a part of a memory area of the external storage medium 5, and at least a part of a program for connecting the operational computer 4 and the relay management server 2 is stored in the portion which cannot be rewritten. According to this constitution, security improvement can be attempted.

Further, to solve the problem described above, the remote access method of the present invention transmits user authentication information from an operational computer to a target computer and, when the target computer determines that the user authentication information is valid, temporarily enables the user to log in to a specific application. For example, logging in with an ID and a password of a valid user is disallowed during a period of time other than a period of time in which the valid user logs in. When the valid user logs in, the target computer receives user information stored in an external storage medium carried by the valid user, thereby determining that the user is valid. After this, the target computer modifies user information and transmits modified password to the operational computer, allowing logging in to the target computer with the modified password only for a predetermined period of time. When logging in is performed, logging in by the valid user is disallowed once again. This prevents an invalid user who knows a valid user ID and a valid password from logging in "spoofing" the other user.

To solve the problem described above, in a remote access method according to a fourth aspect of the present invention, for example, as shown in FIG. 3 and FIG. 4 (FIG. 4A and FIG. 4B) a remote access method for accessing a target computer 21 from an operational computer 24-1 over a network 23, comprises: a user authentication information transmission step (S104) in which the operational computer 24-1 transmits user authentication information to the target computer 21; a user authentication information determination step (S204) in which the target computer 21 determines whether or not the user authentication information transmitted from the operational computer 24-1 is based on original user information of a valid user; and a temporary login permission step (S201, S205-S206, S208-S209) in which the user 20-1 is temporarily enabled to log in to a specific application if it is determined that the user authentication information is based on the original user information of the valid user in the user authentication information determination step.

Here, the target computer 21 is a computer which is an object of remote control, including a server and a client and, further, including a computer for personal use and for business use and a shared computer. Further, the operational computer 24 is a computer which performs remote control of the target computer 21, including a server and a client and, further, including a computer for personal use and for business use and a shared computer. Further, the network 23 may be the Internet or may be an intranet connected or not connected to the Internet. Further, the user authentication information includes original user information, encrypted user information based on the original user information, modified user information made by temporarily modifying original user information, unique identification information stored in an external storage medium 25 carried by a user 20 which corresponds to the user 20 in a one-to-one match, or the like. Typically, a user password and a user ID are used as original user information. However, bio information such as fingerprint information may be used by coding such information. Among these, typically, a user password is used as first original user information used to make modified user information, and, typically, a user ID is used as second original user information used to make encrypted user information. Here, information "based on the original user information" includes the original user information itself and information processed from the original user information. Further, typically, the word "temporarily" refers to a period of time from a time at which modified user information is made to a time immediately after the modified user information is received from the operational computer. However, the word "temporarily" may refer to a predetermined period of time from a time at which the modified user information is transmitted. According to this constitution of the fourth aspect, a period of time during which logging in is possible is limited to a short period of time after determination of authentication information of a valid user. Consequently, it is possible to efficiently prevent an invalid user from logging in "spoofing" the other user.

Further, in a remote access method according to a fifth aspect of the present invention in the remote access method according to the fourth aspect, for example, as shown in FIG. 3 and FIG. 4 (FIG. 4A and FIG. 4B), the temporary login permission step has: a step in which a setting is made to disallow all users to log in to a specific application in advance (S201); a step in which modified user information is made by temporarily modifying first original user information in the original user information (former half part of S205) if it is determined that the user authentication information is based on the original user information of the valid user in the user authentication information determination step (S204); a step in which a setting is made to allow the user 20-1 (later half part of S205) to log in to the specific application to which a setting is made to disallow all users in advance; and a step in which the modified user information is transmitted to the operational computer 24-1 (S206); in the operational computer 24-1, a step in which the modified user information is received (processed at the same time to S206); a step in which the modified user information received in the previous step is automatically input to a login program for the specific application (S106); and a step in which the modified user information input in the previous step is transmitted to the target computer 21 (S107); and the temporary login permission step has: a step in which the user 20-1 is permitted to log in to the specific application when the modified user information transmitted from the operational computer 24-1 is received (S208); and a step in which a setting is made to disallow the user 20-1 to log in to the specific application once again after the user logs in, and the modified user information, which is temporarily modified, is returned to the first original user information (S209).

Here, modified user information is temporarily used. It is necessary that modified user information can be returned to the first original user information, for example, by memorizing the first original user information such as a user password. However, modification may be based on the first original user information, or a pseudo-random number or the like may be temporarily replaced. According to this constitution of the fifth aspect, logging in is allowed based on modified user information. Consequently, an invalid user cannot perform logging in even if he knows first original user information such as a user password.

Further, in a remote access method according to a sixth aspect of the present invention in the remote access method according to the fourth aspect, for example, as shown in FIG. 3 and FIG. 4 (FIG. 4A and FIG. 4B), further comprises: an external storage medium connection step (S102) in which an external storage medium 25-1 carried by the user 20-1 is connected to the operational computer 24-1, and the operational computer 24-1 obtains unique identification information for identifying the external storage medium 25-1 or the original user information from the external storage medium 25-1 and transmits the unique identification information or the original user information as the user authentication information to the target computer 21 in the user authentication information transmission step (S104).

Here, the external storage medium 25 is a storage medium which can be carried by disconnecting the storage medium from a computer and, in addition to this, which has unique identification information. For example, a USB (Universal Serial Bus) key (a USB memory used as a key for personal authentication) and an SD (Safe Driver) memory card can be used. Further, unique identification information is information for identifying the external storage medium 25, for which a unique number, a unique sign, or the like not identical with others is used. According to this constitution of the sixth aspect, unique identification information on the external storage medium 25-1 or original user information stored in the external storage medium 25-1 is automatically transmitted to the target computer 21, and unique identification information on an external storage medium carried by the other person or original user information on the other person are not transmitted. Consequently, logging in can be performed only in relation to an account area of the user and, therefore, cannot be performed "spoofing" the other user.

Further, in a remote access method according to a seventh aspect of the present invention in the remote access method according to the fifth aspect, for example, as shown in FIG. 4 (FIG. 4A and FIG. 4B), further comprises: an external storage medium storing step (S101) in which the external storage medium 25-1 stores unique identification information for identifying the external storage medium 25-1 and an encrypted user information made by encrypting a second user information in original user information with the unique identification information in advance, and an external storage medium connection step (S102) in which an external storage medium carried by the user is connected to the operational computer, and the operational computer 24-1 obtains the second user information by decoding the encrypted user information obtained from external storage medium 25-1 and transmits the second user information obtained to the target computer 21 in the user authentication information transmission step (S104).

Further, a program in an eighth aspect of the present invention is a program in a remote access method for accessing a target computer 21 from an operational computer 24 over a network which enables the operational computer to perform a user authentication information transmission step (S104) in which user authentication information is transmitted to the target computer. This is a program which enables the operational computer 24 to perform the remote access method in the forth aspect. Typically, a program for the operational computer 24 is stored in the external storage medium 25 and installed on the operational computer 24 for use. However, the operational computer 24 may be controlled from the external storage medium 25 without overwriting registry information on the operational computer 24.

Further, a program in a ninth aspect of the present invention is a program in a remote access method for accessing a target computer 21 from an operational computer 24 over a network which enables the target computer 21 to perform a user authentication information determination step (S204) in which it is determined whether or not user authentication information transmitted from the operational computer 24 is based on original user information of a valid user and a temporary login permission step (S201, S205-206, S208-S209) in which the user is temporarily enabled to log in to a specific application if it is determined that the user authentication information is based on the original user information of the valid user in the user authentication information determination step (S204). This is a program which enables the target computer 21 to perform the remote access method in the fourth aspect. Typically, a program for the target computer 21 is stored in the external storage medium 25 and installed on the target computer 21 for use. However, such a program may be stored in the external storage medium 25 shared with the operational computer 24, or may be stored in another external storage medium 25 different from the external storage medium 25 for the operational computer 24.

Further, according to an external storage medium in a tenth aspect of the present invention, in an external storage medium 25 used for accessing a target computer 21 by connecting the external storage medium 25 to an operational computer 24 in a remote access method for accessing the target computer 21 from the operational computer 24 over a network 23, unique identification information for identifying the external storage medium 25 and original user information as user authentication information are stored. Encrypted user information made by encrypting original user information based on unique identification information may be stored.

According to this constitution, when the target computer 21 is accessed from the operational computer 24 over the network 23, unique identification information on the external storage medium 25-1 or original user information stored in the external storage medium 25 is automatically transmitted to the target computer 21, and unique identification information on an external storage medium carried by the other person or original user information on the other person are not transmitted. Consequently, it is only possible to log in to an account area of the user, and therefore it is not possible to perform logging in "spoofing" the other user.

The present invention performs transmission and reception by utilizing the http, https, or SSL protocol. Consequently, the problem described above can be solved only by the fact that the network to which the target computer belongs and the network to which the operational computer belongs are in an environment in which a Web site can be viewed. Accordingly, the present invention can be easily adopted without changing a setting of a router and/or a firewall. Further, when the target computer is accessed from the operational computer according to the present invention, it is possible to prevent an invalid user from logging in "spoofing" the other user.

The present invention will become more fully understood from the detailed description given hereinbelow. Various changes and modifications will be apparent to those ordinary skilled in the art on the basis of the detailed description. However, the detailed description and the specific embodiment are illustrated of desired embodiments of the present invention and are described only for the purpose of explanation. This is because it is clear, from the foregoing description, for those skilled in the art that there could be variations and modifications within the spirit and scope of the present invention.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

DETAILED DESCRIPTION OF THE PREFERRED EMBODIMENT

An embodiment of the present invention will be described herein after with reference to accompanying drawings.

First Embodiment

In the embodiment, a relay management server is disposed on the Internet to appropriately control a target computer (a computer which is an object of remote control, including a server and a client and, further, including a computer for personal use and for business use and a shared computer) and an operational computer (a computer which performs remote control of the target computer, including a server and a client and, further, including a computer for personal use and for business use and a shared computer), and the relay management server translates information on the target computer to transfer to the operational computer and translates information on the operational computer to transfer to the target computer. In addition, an external storage medium such as a USB key used by connecting the external storage medium to the operational computer is used. Consequently, security and convenience are improved in the embodiment. Further in addition, the term the "Internet" as herein referred to includes an intranet on which a Web site can be viewed.

Figure 1:
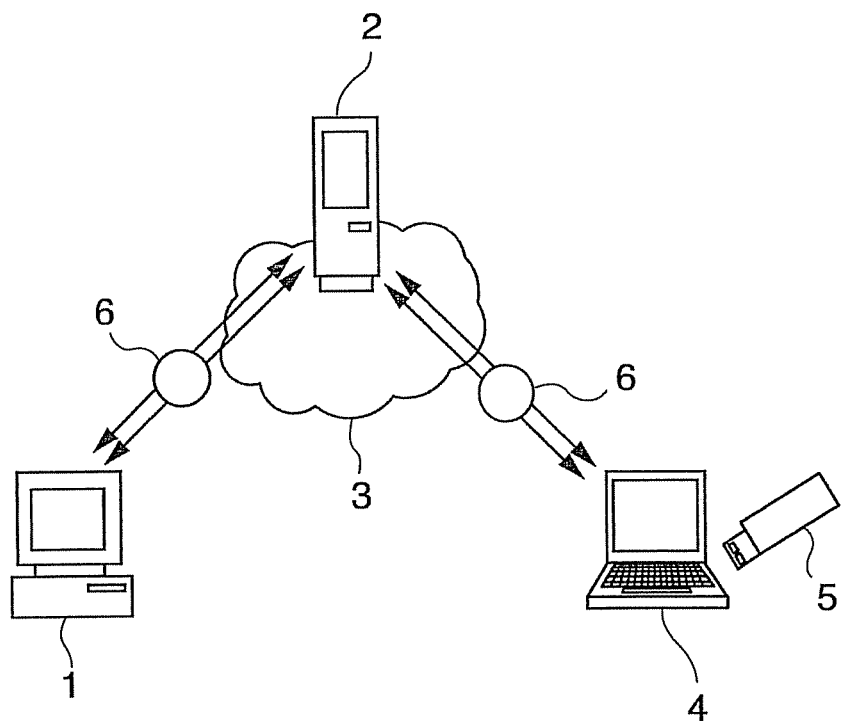
FIG. 1 shows a system configuration according to a first embodiment of the present invention.

The first embodiment of the present invention will be described herein after. FIG. 1 shows a first embodiment of the present invention, illustrating the target computer 1, a relay management server 2, the Internet 3, an operational computer 4, an external storage medium 5, and a router and/or firewall 6. Each user carries the external storage medium 5 having a unique ID respectively and, for example, accesses the target computer on the intranet provided in the user's company from a PC or the like at a destination of a business trip or at the user's home. At least a portion of software which connects the operational computer 4 to the relay management server 2 is stored in the external storage medium 5 such as a USB memory. The both of a unique ID (unique identification information) of the external storage medium 5 and authentication information such as a password manually input by the user are utilized to log in to the relay management server 2.

First of all, the target computer 1 provided on the intranet and the relay management server 2 disposed on the Internet are connected. For this connection, the target computer 1 and the relay management server 2 communicate with the http protocol, and a packet is processed to perform a tunneling connection utilizing port 80. Generally, an outbound http port (port 80) of a router and a firewall is opened so that a Web server disposed on the Internet 3 is able to be viewed from the target computer 1 provided on the intranet. Therefore, as the http protocol is adopted, communication data is possible to pass the router and/or firewall 6. Accordingly, a large number of the target computers 1 in the environment in which a Web site can be viewed can be used.

On the other hand, when the target computer 1 is provided out of the intranet, the target computer 1 and the relay management server 2 communicate still with the http protocol for connection.

During connection, two or more sessions are established between the target computer 1 and the relay management server 2. Actually, connection can be performed by one session. However, when a request is issued with the http protocol, a next request cannot be issued until a response is returned. In the present invention, two or more sessions are established in view of a case in which a response is not returned. Consequently, the target computer 1 and the relay management server 2 are always in a state in which a request and a response can be transmitted. Specifically, the embodiment is characterized in that the target computer 1 is in a state in which, after a request is transmitted, another request can be transmitted in another session separately established. In this embodiment, even if a response is not returned to the target computer 1, a request can be transmitted at any time by utilizing another session already established. Accordingly, communication between the target computer 1 and the relay management server 2 can be efficiently performed.

Following this, the user connects the external storage medium 5 to the operational computer 4 and uses software for a connection stored in the external storage medium 5 to connect the operational computer 4 provided on the intranet to the relay management server 2. Communication is efficiently performed similarly to a case of the target computer 1 by the fact that the http protocol is used, that a packet is processed to perform a tunneling connection utilizing port 80, and that two or more sessions are established between the operational computer 4 and the relay management server 2 for the connection.

Even when the operational computer 4 is connected to the Internet via a dial-up access, a mobile card, or the like, the operational computer 4 and the relay management server 2 still communicate as described above for the connection.

The software which connects the operational computer 4 to the relay management server 2 is stored in the external storage medium 5 such as a USB key and is designed to operate without overwriting registry information on the operational computer 4. A computer of the other person or a thin client can be used as the operational computer 4 by a function described above instead of a computer customized for a person.

It is not necessary to store all portions of the software in the USB key. Needless to say, even when a portion of the program is stored in the operational computer in advance, the same operation can be performed.

In this constitution, the external storage medium 5 has a unique ID, and the operational computer 4 processes the ID information to generate special authentication information to be authenticated by the relay management server 2, transmitting the special authentication information to the relay management server 2. The user inputs authentication information such as a manually input password information or bio information such as fingerprint authentication information to the operational computer 4 for such a transmission. In this constitution, a function described above prohibits a connection to the relay management server 2 unless the both of the authentication information on the external storage medium 5 and the authentication information input by the user are provided.

While the target computer 1 and the operational computer 4 are connected to the relay management server 2 at the same time, the relay management server 2 interprets signals transmitted from the both of the computers, thereby issuing instructions to the both of the computers respectively. Consequently, the operational computer 4 can freely operate the target computer 1.

Software in a higher layer for the operational computer 4 to operate the target computer 1 is out of the scope of the present invention. However, applications for TCP connection such as Windows (registered trademark of Microsoft Corporation) Remote Desktop, VNC, and Telnet can be utilized. For example, when Remote Desktop is utilized, key input information and pointing information on a mouse are transmitted from the operational computer 4 to the target computer 1, and desktop (image) information is transmitted from the target computer 1 to the operational computer 4. Consequently, the operational computer 4 can freely operate the target computer 1. In this case, it is the desktop (image) that is transferred from the intranet to the outside. A file on the target computer 1 is not taken out of the intranet. Accordingly, security can be ensured.

Needless to say, signals and the like exchanged among the target computer 1, the relay management server 2, and the operational computer 4 are encrypted.

Further, a portion which is not rewritable is provided in a part of a memory area in the external storage medium 5, in which a program and a setting file are stored. In this constitution, it can be prevented that security is degraded by the fact that the user changes a setting to make a file transfer possible or the like. Consequently, further security improvement can be attempted.

Second Embodiment

Figure 2:
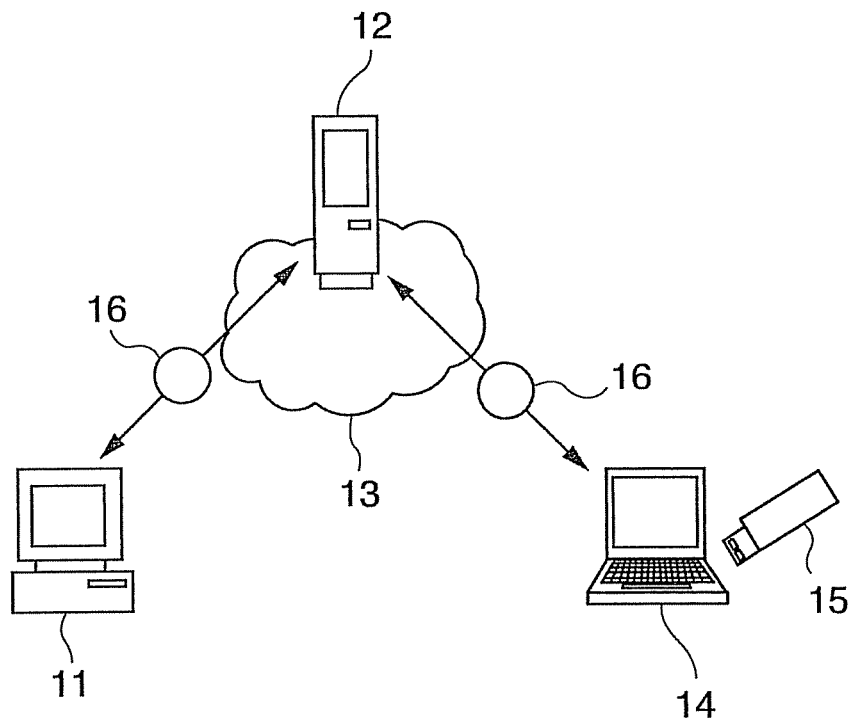
FIG. 2 shows a system configuration according to a second embodiment of the present invention.

A second embodiment of the present invention will be described herein after. FIG. 2 shows the second embodiment of the present invention, illustrating a target computer 11, a relay management server 12, the Internet 13, an operational computer 14, an external storage medium 15, and a router and/or firewall 16.

First of all, the target computer 11 provided on an intranet and the relay management server 12 disposed on the Internet 13 are connected. For this connection, the target computer 11 and the relay management server 12 communicate with the https protocol or the SSL protocol. An outbound https port (port 443) of a router and a firewall is opened because a large number of the target computers 11 provided on the intranet performs an encrypted communication with a Web server disposed on the Internet 13. Therefore, as the https or the SSL protocol is adopted, and as a packet is processed to perform a tunneling connection utilizing port 443, communication data is possible to pass the router and/or firewall 16. Accordingly, a large number of the target computers 11 in the environment in which encrypted communication can be performed with a Web server can be utilized.

On the other hand, when the target computer 11 is provided out of the intranet, the target computer 11 and the relay management server 12 communicate still with the https or the SSL protocol for connection.

During connection, one session or more is established between the target computer 11 and the relay management server 12. When a request is issued in communication with the https or the SSL protocol, a next request can be issued even if a response is not returned. Accordingly, communication between the target computer 11 and the relay management server 12 can be efficiently performed by one session.

Following this, the operational computer 14 provided on the intranet is connected to the relay management server 12. Communication is efficiently performed similarly to a case of the target computer 11 by the fact that the https or the SSL protocol is used, that a packet is processed to perform a tunneling connection utilizing port 443, and that one session or more is established between the operational computer 14 and the relay management server 12 for the connection.

Even when the operational computer 14 is provided out of the intranet, the operational computer 14 and the relay management server 12 still communicate as described above for the connection.

Third Embodiment

In an example of the remote access method according to a third aspect, user authentication information is transmitted from an operational computer to a target computer, and the user is temporarily enabled to log in to a specific application if the target computer determines that the user authentication information is valid. In the example, when a valid user logs in, the target computer modifies the user password as first original user information and temporarily allows logging in to the target computer with modified user information. In the example, an invalid user is prevented from logging in "spoofing" the other user. Further in the example, a user ID as second original user information is encrypted and stored in a USB key as an external storage medium having unique identification information and decoded on the operational computer for a transmission to the target computer. Still further in the example, one target computer can be accessed from four operational computers.

Figure 3:
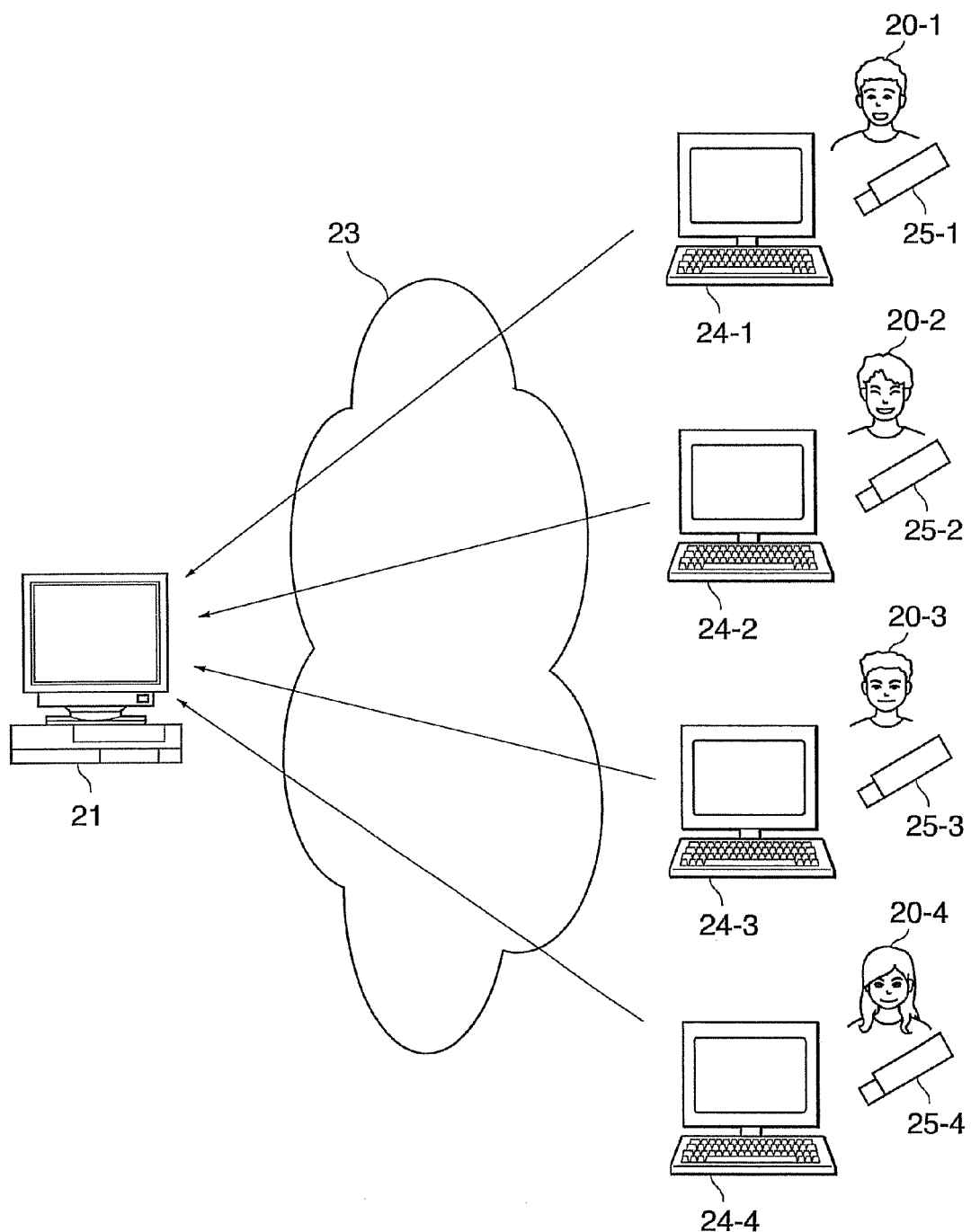
FIG. 3 is a drawing illustrating an example of a constitution of a remote access system according to a third embodiment of the present invention.

FIG. 3 illustrates an example of a constitution of a remote access system according to the third embodiment. FIG. 3 illustrates users 20-1 to 20-4 (referred to as the user 20 if it is not necessary to identify a specific user), the target computer 21 (a computer which is an object of remote control, including a server and a client and, further, including a computer for personal use and for business use and a shared computer) to be operated, target computers 24-1 to 24-4 which operates the target computer (a computer which performs remote control of the target computer, including a server and a client and, further, including a computer for personal use and for business use and a shared computer; and referred to as the operational computer 24 if it is not necessary to identify a specific operational computer), the network 23 over which the target computer 21 and the operational computer 24 are connected, and external storage media 25-1 to 25-4 inserted in the operational computer (referred to as the external storage medium 25 if it is not necessary to identify a specific external storage medium).

The network 23 may be the Internet or may be an intranet connected or not connected to the Internet. When the target computer 21 on the intranet is remotely accessed from an operational computer on another intranet via the Internet, normally, communication connection is established via a router and/or a firewall provided in a DMZ zone (demilitarized zone) on the border between the Internet and the intranet. For example, a server on which a specific application such as a terminal service is shared on the intranet of a company and a PC (personal computer) usually used by the user at the user's desk can be used as the target computer 21. On the other hand, for example, a PC on some other floor in the user's company, at the user's home, at a destination of a business trip in or out of the user's country, and a portable terminal carried by the user can be used as the operational computer 24. The user 26 can remotely access the target computer 21 from the operational computer 24 and can perform remote control as if the user were operating the target computer 21 at the user's desk.

The external storage medium 25 is a storage medium which can be carried separately from the computer, has unique identification information, and stores the unique identification information and a program for performing a remote access from the operational computer 24 to the target computer 21. A USB key, an SD memory card, or the like can be used as the external storage medium 25 (a USB key is used in the embodiment). The external storage media 25-1 to 25-4 are carried by the users 20-1 to 20-4 respectively. The external storage medium 25 and the user correspond to each other in a one-to-one match. It is decided in advance that each external storage medium is used in combination with its specific user. Moreover, the external storage medium 25 stores encrypted user information made by encrypting second original user information as authentication information based on unique identification information on the user. In the embodiment, a user ID is used as the second original user information.

The operational computers 24-1 to 24-4 can be connected to one target computer 21 over the network 23. In this constitution, the users 20-1 to 20-4 can log in to a specific application such as a terminal service of the target computer 1 from any one of the four operational computers 24 by using the unique identification information on the external storage media 25-1 to 25-4 carried by the users 20-1 to 20-4 and the user password and the user ID specific to the users 20-1 to 20-4. Under such a situation, for example, a person who carries the external storage medium 25-2 may perform logging in "spoofing" of the user 20-1 if the person obtains the user password and the user ID of the user 20-1, connects the external storage medium 25-2 to any one of the operational computers 24, and inputs the user password and the user ID of the user 20-1 during logging in to the target computer 21.

In the embodiment, the external storage medium (USB key) 25, the operational computer 24, and the target computer 21 are constituted as described below to prevent such "spoofing." It is assumed that the user 20-1 carries a USB key 25-1 and logs in to a specific application on the target computer 21 from the operational computer 24-1. The user ID as the second original user information is encrypted in advance with the unique identification information on the USB key 25-1 carried by the user 20-1 as a key, and encrypted user information is stored in the USB key 25 carried by the user 20-1. It is preferable that the encrypted user information once stored is not rewritable to maintain the one-to-one mach between the USB key 25 and the user authentication information. The operational computer 24-1 has a function by which, when the USB key 25-1 is connected, the encrypted user information stored in the connected USB key 25-1 is decoded and transmitted to the target computer 21 with the user password input by the user 20-1 as the first original user information. The encrypted user information is decoded into the user ID as the second original user information on the user carrying the USB key 25-1 and transmitted to the target computer 21 with the user password. Here, a user ID of some other user is not transmitted. Consequently, it is only possible to log in to an account area of the user, and therefore it is not possible to perform logging in "spoofing" the other user.

The target computer 21 makes a setting in advance to disallow any user to log in to a specific application and temporarily allows logging in only when a valid user tries to log in. In other words, only when it is determined that the user authentication information received from the operational computer 24-1 is based on the user password and the user ID as the original user information on the valid user 20-1, the user password as the first original user information is temporarily modified to generate modified user information. In the embodiment, the user password is used as the first original user information. The target computer 21 registers the original user information on each user (a user ID and a user password) in a built-in memory in advance and compares a received user password and a received user ID as the user authentication information with the registered information to determine whether or not the user password and the user ID are based on the original user information of the valid user. Then, the target computer 21 makes a setting to allow the user 20-1, who has been disallowed to perform logging in, to log in to the specific application and modifies the first original user information as authentication information to transmit the modified user information to the operational computer 24-1. In addition, when receiving the modified user information, the operational computer 24-1 automatically inputs the modified user information to the login program for the specific application to transmit the modified user information to the target computer 21 with the user ID already decoded from the encrypted user information. When receiving the modified user information and the user ID, the target computer 21 authenticates the received modified user information and the received user ID, thereby allowing the user 20-1 to log in to the specific application. Moreover, after the logging in is performed, the target computer 21 makes a setting to disallow the user 20-1 to log in to the specific application once again and, at the same time with this, returns the modified user information, which has been temporarily modified, to the original user password.

According to this constitution, each user 20 is only temporarily allowed to log in to the specific application, in addition, only by using the modified user information. It is difficult for an invalid user to obtain the modified user information to access in such a short period of time. Moreover, the second original user information is encrypted and stored in the USB key 25 and decoded for a transmission to the target computer 21. Consequently, it is not possible to log in to an account area other than an account area assigned to the person who carries the USB key 25. This prevents logging in "spoofing" the other user. In addition, when someone who does not carry the USB key 25 inputs the user password and the user ID from the operational computer 24, the modified user information is transmitted from the target computer 21. However, when the program for the remote access method stored in the USB key 25 is not used, it is not possible for the operational computer 24 to receive the modified user information, to automatically input the modified user information to the login program for the specific application, and to perform a transmission to the target computer 21. Therefore, it is not possible for anyone who does not carry the USB key 25 to perform logging in.

Figure 4A:
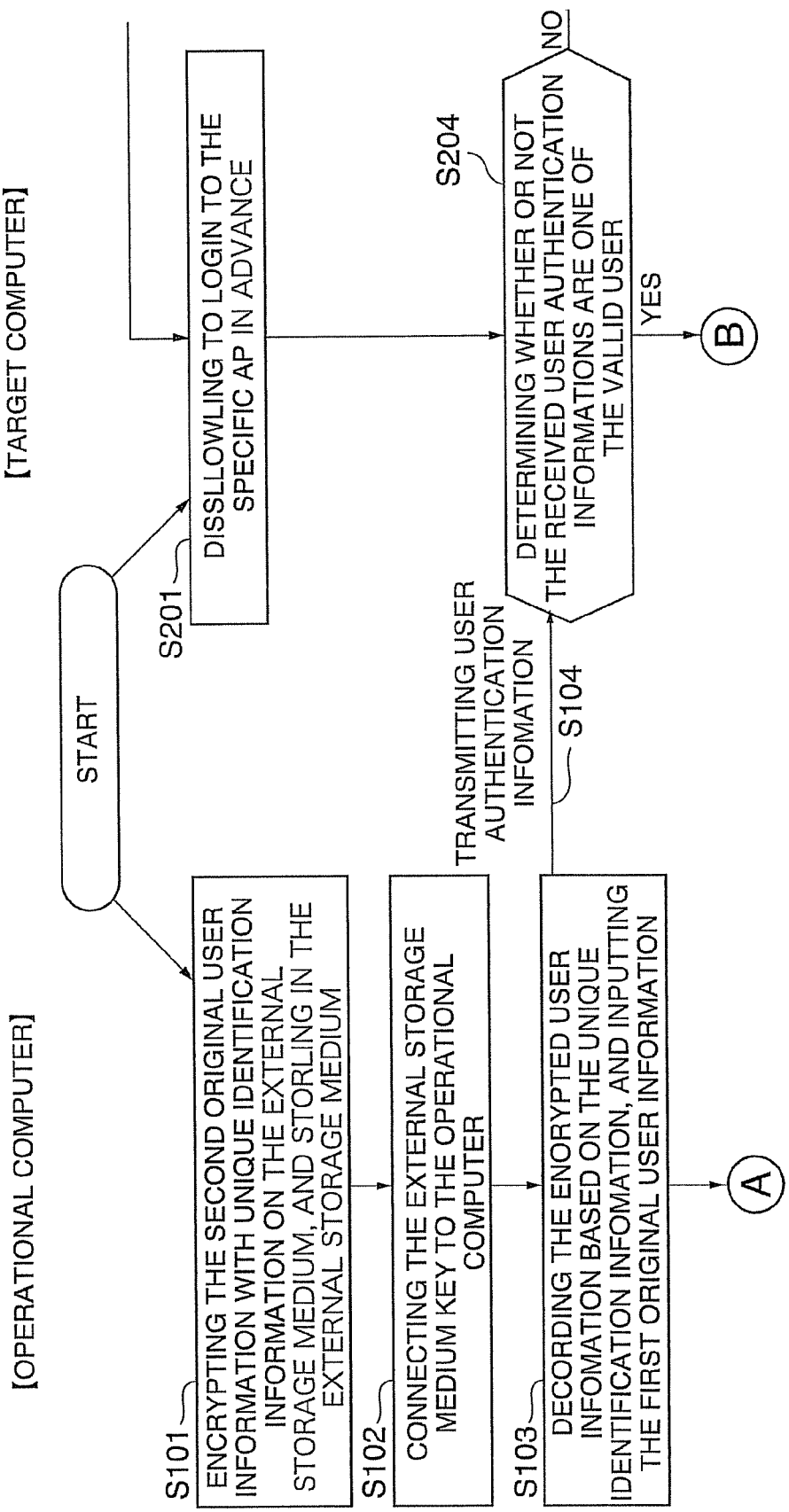
FIG. 4 (FIG. 4A and FIG. 4B) is a drawing illustrating an example of a process flow of a remote access method according to the third embodiment of the present invention.
Figure 4B:
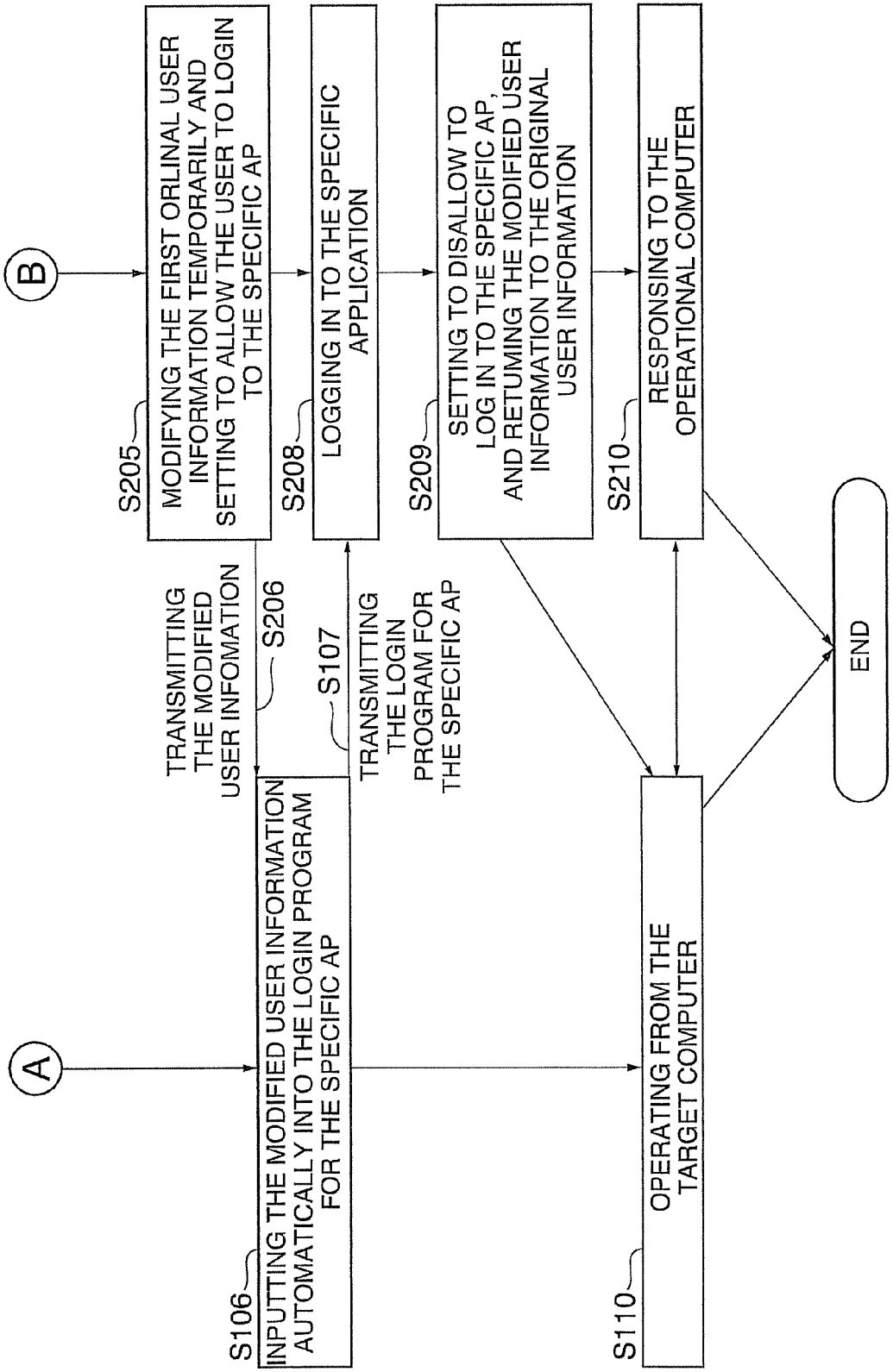

FIG. 4 (FIG. 4A and FIG. 4B) illustrates an example of a process flow of the remote access method according to the embodiment. A process flow in relation to the operational computer 24 is illustrated on the left side, and a process flow in relation to the target computer 21 is illustrated on the right side. It is assumed that the user 20-1 carries the USB key 25-1 and logs in to the specific application (indicated as "specific AP" in the drawing) on the target computer 21 from the operational computer 24-1.

On the side of the operational computer 24-1, encrypted user information made by encrypting a user ID as second original user information with unique identification information as a key is stored in advance in the USB key 25-1 carried by the user 20-1 which has unique identification information as user authentication information for logging in to the specific application on the target computer 21 (S101).

On the other hand, the target computer 21 disallows all the users to log in to the specific application in advance (S201). For example, a flag is used to set whether logging in is allowed or disallowed.

On the side of the operational computer 24-1, the user 20-1 carrying the USB key 25-1 inserts and connects the USB key 25-1 to the operational computer 24-1 (S102). In a step for logging in to the operational computer 24-1, the operational computer 24-1 decodes the encrypted user information based on the unique identification information on the inserted USB key 25-1 to obtain the user ID and, in addition, obtains the user password as the first original user information input by the user 20-1 (S103), transmitting the original information as user authentication information or, in other words, the user ID and the user password to the target computer 21 (S104).

The target computer 21 determines whether or not the received user ID and the received user password are the user authentication information of the valid user 20-1 or, in other words, whether or not logging in to the target computer 21 is allowed (S204). For example, the target computer 21 registers the original user information (the user ID and the user password) on each of the users 20-1 to 20-4 in the built-in memory in advance and compares the received user ID and the received user password with the registered information. When it is determined that the user ID and the user password are the user authentication information on the valid user 20-1 (a case of "YES"), the user password is temporarily modified into modified user information (into a modified user password). Then, a setting is made to allow the user 20-1, who has been disallowed to perform logging in, to log in to the specific application (S205), and the modified user information, which has been temporarily modified, is transmitted to the operational computer 24-1 (S206). On the other hand, when it is determined that the user ID or the user password are not the user authentication information of the valid user 20-1 ("NO" in step S204), a setting is maintained to disallow logging in to the specific application (the procedure goes back to step S201)

The user password is modified before logging in is allowed as described above. Consequently, even if an invalid user who knows the user password before modification tries to perform logging in within a short period of time, the invalid user cannot successfully logs in. In other words, the invalid user cannot perform invalid logging in at any time.

After the operational computer 24-1 receives the modified user information, which has been temporarily modified, the modified user password received is automatically input to the login program for the specific application (S106). The operational computer 24-1 transmits the input modified user password to the target computer 21 with the user ID already decoded from the encrypted user information (S107). The target computer 21 compares the modified user password input to the login program and the transmitted user ID with the information registered in the built-in memory, performs authentication, references the flag, and allows the valid user 20-1 to log in to the specific application on the target computer 21 (S208). When someone who does not carry the USB key 25 inputs the user password and the user ID from any one of the operational computers 24, the modified user password is transmitted from the target computer 21. However, when the program for the remote access method stored in the USB key 25 is not used, it is not possible that the modified user password is received by the operational computer 24. Consequently, the modified user information is not automatically input to the login program for the specific application, and therefore, transmission to the target computer 21 is not performed. As a result, it is not possible for anyone who does not carry the USB key 25 to perform logging in.

Following this, after the user 20-1 logs in to the specific application, the target computer 1 makes a setting to disallow the user 20-1 to log in to the specific application once again and, at the same time with this, returns the modified user information to the original user password (S209).

This is because a login process is, in general, not necessary any more after the login process is once validly performed and therefore the user 20-1 can continue an operation even if a setting is made to disallow logging in. As for an invalid user, the invalid user is disallowed to log in even if the invalid user tries to perform logging in. Accordingly, the invalid user cannot successfully perform logging in.

Further, as the modified user information is returned to the original user password, it is possible to determine whether the user 20 attempting to have an access is a valid user or an invalid user during a login process on a next occasion.

After logging in to the specific application, the user 20-1, for example, can view the image information (bitmap information) on the specific application transmitted to the operational computer 24-1 from the target computer 21 and operate the keyboard and the mouse, thus transmitting command information depending on the keyboard and the mouse from the operational computer 24-1 to the target computer 21. The target computer 21 can be operated from the operational computer 24-1 in this manner (S110). When receiving the command information, the target computer 21 analyzes the command information to process the specific application, thus transmitting the image information (bitmap information) after such processing to the operational computer 24-1 (S210). Accordingly, the user 20-1 operates the keyboard and the mouse of the operational computer 24-1 once again, thus transmitting the command information to the target computer 21. Remote operations of the target computer 21 are performed from the operational computer 24-1 by alternately repeating step S110 and step S210. When the operations are completed, logging in is terminated.

As described above, according to the embodiment, when the target computer is accessed from the operational computer, even if an invalid user knows a user password and a user ID of a valid user, it is possible to prevent logging in "spoofing" the other user. Accordingly, information leakage caused by an invalid user can be prevented, and therefore business operations are securely performed. Consequently, it is possible to correspond to rising security awareness in business fields.

Fourth Embodiment

In the example of the third embodiment, the four operational computers 24 are connected to one target computer 21. In the example of a fourth embodiment, the number m of operational computers 24 are connected to the number n of target computers 21. Here, m and n are integers equal to 1 or greater than 1.

The user 20 can remotely access a plurality of the target computers 21 from the operational computer 24. In this case, when the user 20 performs a remote access from the operational computer 24, the user 20 specifies the target computer 21 to perform the remote access. If a plurality of target computers 21 is on one intranet, the target computers 21 may be connected for communication via a proxy server provided in the DMZ area in a constitution. The system constitution and process flow other than what is described above are the same as those in the first embodiment.

Fifth Embodiment

In the example of the third embodiment, the user ID as the second original user information is encrypted and stored in the USB key as the external storage medium having the unique identification information and decoded on the operational computer for a transmission to the target computer. In the example of a fifth embodiment, a user ID itself is stored in the USB key 25-1, obtained by the operational computer 24-1, and automatically transmitted to the target computer 21. Also in this case, the user ID as the second original user information is automatically transmitted to the target computer 21. Consequently, it is not possible to log in to an account area of some other user. The system constitution and process flow other than what is described above are the same as those in the first embodiment.

Sixth Embodiment

In the example of the third embodiment, the user ID as the second original user information is encrypted and stored in the USB key as the external storage medium having the unique identification information and decoded on the operational computer for a transmission to the target computer. In the example of a sixth embodiment, unique identification information is stored in the USB key 25-1 as an external storage medium, obtained by the operational computer 24-1, and automatically transmitted to the target computer 21. In this case, the unique identification information on the USB key 25 is automatically transmitted to the target computer 21 instead of the user ID as the second original user information. The USB key 25 and the user 20 carrying the USB 25 correspond to each other in a one-to-one match. The target computer 21 registers the original user information of each user (a user ID and a user password) and the unique identification information on the USB key 25 in a built-in memory in advance and temporarily allows logging in to the account area of the user ID corresponding to the unique identification information on the USB key 25. Consequently, it is not possible to log in to an account area of some other user. On the other hand, if the user ID and the user password input to the operational computer 24 by the user 20 and the transmitted unique identification information are not matched with each other, logging in is not allowed. The system constitution and process flow other than what is described above are the same as those in the first embodiment. The unique identification information may be encrypted and stored in the USB key 25, decoded on the operational computer 24, and transmitted to the target computer 21.

The present invention can be also achieved as a program which enables the operational computer and the target computer to perform the remote access methods described in above described embodiments or as a program which enables the relay management server, the operational computer, and the target computer to perform the remote access methods described in above described embodiments. In addition, the present invention can be also achieved as an external storage device which stores a program. The program may be used by being stored in an external storage medium such as a USB key and an SD card or may be used by being stored in an external storage device for the operational computer. Further in addition, the program may be installed to the operational computer and the target computer from external storage media or the like respectively or may be used by downloading the program from the Internet. Still further in addition, the program may be stored in one external storage medium, may be divided and stored in a plurality of external storage media, or may be divided and stored in the operational computer and the target computer.

The embodiments of the present invention are described above. However, the present invention is not limited to the embodiments above, but it is clear that various modifications can be applied to the embodiments. For example, in the examples of the third to the sixth embodiments, the authentication information and the program stored in the external storage medium 25 are used in the remote access method of accessing the target computer 21 from the operational computer 24-1 over the network 23. However, if the user authentication information transmission step, a user authentication information determination step, and a temporary login permission step are processed, the transmission of the user authentication information may be performed by a manual input given by the user without using the external storage medium 25 or the remote access method may be processed on the hardware without using the program. Further, in the example of the third embodiment, the original user information is transmitted from the operational computer 24 to the target computer 21. However, the original user information may be encrypted before transition, and it is preferable that encryption is performed particularly in a case of transmission over the Internet from the viewpoint of security. Further, in the example of the third embodiment, the encrypted user information is decoded on the operational computer 24-1. However, the operational computer 24-1 may transmit the encrypted user information as it is to the target computer 21, and the target computer may decode the encrypted user information. Further, a portion which is not rewritable may be provided in a part of the external storage medium 25, and the unique identification information and the encrypted user information may be stored in the portion.

Further, if the modified user information can be decoded to restore the original user information, for example, by storing the original user information in advance, modification may be performed based on the original user information, or a pseudo-random number or the like may be temporarily replaced. Further, in the examples of the third to the fifth embodiments, the user password is used as the first original user information, and the user ID is used as the second original user information. However, the user ID may be used as the first original user information, and the user password is used as the second original user information, or the user ID or the user password may be commonly used as the first and the second original user information. Further, bio information such as fingerprint authentication may be encoded and used as the original user information. Further, in the examples of the third to the fifth embodiments, the user authentication information is the original user information itself. However, the original user information may be some information processed based on the original user information, may be the unique identification information on the external storage medium as illustrated in the sixth embodiment, or may be some information processed based on the unique identification information. Further, the sequence of the steps for modifying the user information and for allowing logging in to the specific AP (application) and the sequence of the steps for disallowing logging in to the specific AP and restoration from the modified user information may be reversed respectively. Various modifications are possible in the system constitution, the process flow, and the like other than what is described above.

As described above, according to the remote access method of the present invention, only an external storage medium such as a USB key is carried, and a computer of the other person at a site other than a user's office, a thin client, or the like is utilized to attempt to have a full access to a computer in the user's office during a business trip or from the user's home. Consequently, improvement in convenience is expected. As the external storage medium has a unique ID, it is not possible to have an access if the external storage medium is not used. Consequently, leakage of company information is prevented, and improvement in security is expected. Moreover, the target computer is accessed without changing settings of the firewall in use, and it is expected that security improvement can be attempted. Accordingly, speedy business operations are possible, and improvement of productivity in business operations is attempted. Further, the remote access method of the present invention can be used for an art of server based computing (SBC) in which an operational computer and a target computer are mutually connected over a network to achieve secure business operations.

DESCRIPTION OF REFERENCE NUMERALS AND SYMBOLS 1, 11: target computer
2, 12: relay management server
3, 13: Internet
4, 14: operational computer
5, 15: external storage medium
6, 16: router, firewall
20, 20-1 to 20-4: user
21: target computer
23: network
24, 24-1 to 24-4: operational computer
25, 25-1 to 25-4: external storage medium

What is claimed is:

1. A remote access method in which an operational computer on an intranet accesses a target computer on the same or on another intranet via a relay management server on the Internet, comprising:
   a step in which each user carries an external storage medium having unique identification information different from each other;
   a step in which the target computer transmits authentication information on each user to the relay management server to establish a connection;
   a step in which at least a portion of a program for connecting the operational computer and the relay management server is stored in advance in the external storage medium;
   a step in which the external storage medium having the unique identification information is connected to the operational computer;
   a step in which the operational computer processes the unique identification information to generate special authentication information for the relay management server to perform authentication;
   a step in which the user inputs authentication information for authentication of the user from the operational computer;
   a step in which the operational computer transmits authentication information and the special authentication information for authentication of the user to the relay management server at the same time; and
   a step in which the relay management server permits connection to the operational computer by one time of authentication when the both of the authentication information and the special authentication information for authentication of the user are transmitted from the operational computer;
   wherein, the relay management server is not on the intranet of the operational computer or on the Intranet of the target computer, and operational computers in more than two intranets can access the relay management server and the relay management server can access target computers in more than two Intranets; and
   wherein, the relay management server transmits image information on the target computer to the operational computer without taking out a file recorded in the target computer and transmits keyboard information or pointing information from the operational computer to the target computer without taking out a file recorded in the operational computer.

2. The remote access method as recited in claim 1, wherein the target computer uses an http protocol, an https protocol, or an SSL protocol to transmit the image information without transmitting the file recorded in the target computer to the operational computer via the relay management server,
   the operational computer uses the http protocol, the https protocol, or the SSL protocol to transmit keyboard information or pointing information without transmitting the file recorded in the operational computer to the target computer via the relay management server,
   the relay management server translates information on the target computer to transfer to the operational computer and translates information on the operational computer to transfer to the target computer,
   a tunneling connection utilizing port 80 is performed by using two sessions or more when not using https or SSL, and
   a tunneling connection utilizing port 443 is performed by using one session or more when the https protocol or the SSL protocol is used.

3. The remote access method as recited in claim 1, wherein a portion which cannot be rewritten by a user is provided at least in a part of a memory area of the external storage medium, and
   at least a part of a program for connecting the operational computer and the relay management server is stored in the portion which cannot be rewritten.

4. A non-transitory computer readable storage medium used for accessing a target computer by connecting the external storage medium to an operational computer in a remote access method as in claim 1 for accessing the target computer from the operational computer over a network,
   wherein unique identification information for identifying the external storage medium and original user information as user authentication information are stored in the non-transitory computer-readable storage medium.

5. The remote access method as recited in claim 2, wherein a software which connects the operational computer to the relay management server is stored in the external storage medium and is designed to operate without overwriting a registry.

6. The remote access method as recited in claim 2, wherein the target computer and the relay management server communicate with the http protocol and a packet is processed to perform a tunneling connection, wherein said tunneling connection is utilizing port 80.

7. The remote access method as recited in claim 2, wherein the target computer and the relay management server communicate with the http protocol and two or more sessions are established between the target computer and the relay management server.

8. A remote access method in which an operational computer on an intranet accesses a target computer on the same or on another intranet via a relay management server on the Internet, comprising:
- a step in which each user carries an external storage medium having unique identification information different from each other;
- a step in which the target computer transmits authentication information on each user to the relay management server to establish a connection;
- a step in which at least a portion of a program for connecting the operational computer and the relay management server is stored in advance in the external storage medium;
- a step in which the external storage medium having the unique identification information is connected to the operational computer;
- a step in which the operational computer processes the unique identification information to generate special authentication information for the relay management server to perform authentication;
- a step in which the user inputs authentication information for authentication of the user from the operational computer;
- a step in which the operational computer transmits authentication information and the special authentication information for authentication of the user to the relay management server at the same time; and
- a step in which the relay management server permits connection to the operational computer by one time of authentication when the both of the authentication information and the special authentication information for authentication of the user are transmitted from the operational computer;
- wherein, the relay management server is not on the intranet of the operational computer or on the Intranet of the target computer, and operational computers in more than two intranets can access the relay management server and the relay management server can access target computers in more than two Intranets; and
- wherein, if the one time of authentication is achieved, the target computer transmits only information for reproducing a desktop output of the target computer to the operational computer via the relay management server.

9. The remote access method as recited in claim 8, wherein the target computer uses an http protocol, an https protocol, or an SSL protocol to transmit the information for reproducing the desktop output of the target computer to the operational computer via the relay management server,
- the operational computer uses the http protocol, the https protocol, or the SSL protocol to transmit keyboard information or pointing information to the target computer via the relay management server,
- the relay management server translates the information for reproducing the desktop output of the target computer to transfer to the operational computer and translates the keyboard information or the pointing information to transfer to the target computer,
- a tunneling connection utilizing port 80 is performed by using two sessions or more when not using https or SSL, and
- a tunneling connection utilizing port 443 is performed by using one session or more when the https protocol or the SSL protocol is used.

10. The remote access method as recited in claim 8,
wherein a portion which cannot be rewritten by a user is provided at least in a part of a memory area of the external storage medium, and
at least a part of a program for connecting the operational computer and the relay management server is stored in the portion which cannot be rewritten.

11. A non-transitory computer readable storage medium used for accessing a target computer by connecting the external storage medium to an operational computer in a remote access method as in claim 8 for accessing the target computer from the operational computer over a network,
wherein unique identification information for identifying the external storage medium and original user information as user authentication information are stored in the non-transitory computer-readable storage medium.

12. The remote access method as recited in claim 9,
wherein a software which connects the operational computer to the relay management server is stored in the external storage medium and is designed to operate without overwriting a registry.

13. The remote access method as recited in claim 9,
wherein the target computer and the relay management server communicate with the http protocol and a packet is processed to perform a tunneling connection, wherein said tunneling connection is utilizing port 80.

14. The remote access method as recited in claim 9,
wherein the target computer and the relay management server communicate with the http protocol and two or more sessions are established between the target computer and the relay management server.

* * * * *